United States Patent
Shupe et al.

(10) Patent No.: US 8,930,032 B2
(45) Date of Patent: Jan. 6, 2015

(54) SYSTEM AND METHOD FOR WIRELESS IRRIGATION CONTROL WITH A REMOTE APPLICATION

(75) Inventors: Deborah Gail Shupe, Highlands Ranch, CO (US); Michael Edward Shupe, Highlands Ranch, CO (US); Jeffery Stephen Bettcher, Highlands Ranch, CO (US); Anthony Carlo Zambai, Parker, CO (US)

(73) Assignee: ZBS Technology, LLC, Parker, CO (US)

( * ) Notice: Subject to any disclaimer, the term of this patent is extended or adjusted under 35 U.S.C. 154(b) by 453 days.

(21) Appl. No.: 13/302,987

(22) Filed: Nov. 22, 2011

(65) Prior Publication Data

US 2013/0131874 A1    May 23, 2013

(51) Int. Cl.
| | |
|---|---|
| G05D 11/00 | (2006.01) |
| G05B 11/01 | (2006.01) |
| B05B 17/04 | (2006.01) |
| G08B 1/08 | (2006.01) |
| A01G 25/16 | (2006.01) |

(52) U.S. Cl.
CPC ........................... A01G 25/16 (2013.01)
USPC ............. 700/284; 700/278; 239/11; 239/63; 239/69; 340/539.1; 340/3.1

(58) Field of Classification Search
USPC ...................... 700/282, 284, 67, 18
See application file for complete search history.

(56) References Cited

U.S. PATENT DOCUMENTS

| | | | |
|---|---|---|---|
| 6,823,239 B2 | 11/2004 | Sieminski | |
| 7,010,396 B2 | 3/2006 | Ware et al. | |
| 7,058,479 B2 | 6/2006 | Miller | |
| 7,339,957 B2 * | 3/2008 | Hitt | 370/509 |
| 7,359,769 B2 * | 4/2008 | Bailey et al. | 700/284 |
| 7,400,944 B2 * | 7/2008 | Bailey et al. | 700/284 |
| 7,412,303 B1 * | 8/2008 | Porter et al. | 700/284 |
| 7,444,207 B2 * | 10/2008 | Nickerson et al. | 700/284 |
| 7,640,079 B2 * | 12/2009 | Nickerson et al. | 700/284 |
| 7,778,736 B2 | 8/2010 | Sutardja | |
| 7,788,970 B2 * | 9/2010 | Hitt et al. | 73/73 |
| 7,805,221 B2 * | 9/2010 | Nickerson | 700/284 |
| 7,825,793 B1 * | 11/2010 | Spillman et al. | 340/539.1 |
| 7,844,367 B2 * | 11/2010 | Nickerson et al. | 700/284 |
| 7,844,369 B2 * | 11/2010 | Nickerson | 700/284 |
| 7,853,363 B1 * | 12/2010 | Porter et al. | 700/284 |
| 7,877,168 B1 * | 1/2011 | Porter et al. | 700/284 |

(Continued)

*Primary Examiner* — Mohammad Ali
*Assistant Examiner* — Kelvin Booker
(74) *Attorney, Agent, or Firm* — Daniel W. Roberts; Law Offices of Daniel W. Roberts, LLC

(57) ABSTRACT

Provided are a system and method for wireless irrigation control with a remote application. The system includes a processor and plurality of interactive zone switches for connection to at least one irrigation device; each zone switch further operable to detect a state of a connected irrigation device. Non-volatile memory is coupled to the processor and provided with executable instructions to direct operation of each interactive zone switch. There is at least one remote application to establish a schedule within the non-volatile memory for operation for each interactive zone switch and to receive the schedule from the non-volatile memory in response to a users desire to review or modify the schedule. A wireless network component is coupled to the processor and the non-volatile memory and is in communication with the remote application to schedule operation of at least one interactive zone switch and at least one irrigation device.

27 Claims, 5 Drawing Sheets

(56) References Cited

U.S. PATENT DOCUMENTS

| | | | |
|---|---|---|---|
| 7,883,027 B2* | 2/2011 | Fekete | 239/11 |
| 7,962,244 B2* | 6/2011 | Alexanian | 700/284 |
| 7,996,115 B2* | 8/2011 | Nickerson et al. | 700/284 |
| 8,013,732 B2* | 9/2011 | Petite et al. | 340/539.1 |
| 8,024,075 B2* | 9/2011 | Fekete | 700/284 |
| 8,104,993 B2* | 1/2012 | Hitt et al. | 405/37 |
| 8,170,721 B2* | 5/2012 | Nickerson | 700/282 |
| 8,193,930 B2* | 6/2012 | Petite et al. | 340/539.1 |
| 8,200,368 B2* | 6/2012 | Nickerson et al. | 700/284 |
| 8,209,061 B2* | 6/2012 | Palmer et al. | 700/284 |
| 8,219,254 B2* | 7/2012 | O'Connor | 700/282 |
| 8,244,404 B2* | 8/2012 | Nickerson | 700/284 |
| 8,265,797 B2* | 9/2012 | Nickerson et al. | 700/284 |
| 8,301,309 B1* | 10/2012 | Woytoxitz et al. | 700/284 |
| 8,326,440 B2* | 12/2012 | Christfort | 700/21 |
| 8,379,564 B2* | 2/2013 | Petite et al. | 370/320 |
| 8,417,390 B2* | 4/2013 | Nickerson et al. | 700/284 |
| 8,442,071 B2* | 5/2013 | Ishii | 370/473 |
| 8,548,632 B1* | 10/2013 | Porter et al. | 700/284 |
| 8,565,904 B2* | 10/2013 | Bragg et al. | 700/67 |
| 8,600,569 B2* | 12/2013 | Woytowitz et al. | 700/284 |
| 8,606,413 B2* | 12/2013 | Picton | 700/282 |
| 8,606,415 B1* | 12/2013 | Woytowitz et al. | 700/284 |
| 8,615,329 B2* | 12/2013 | O'Connor | 700/282 |
| 8,649,907 B2* | 2/2014 | Ersavas | 700/275 |
| 8,649,910 B2* | 2/2014 | Nickerson et al. | 700/284 |
| 8,738,188 B2* | 5/2014 | Nickerson et al. | 700/284 |
| 8,793,024 B1* | 7/2014 | Woytowitz et al. | 700/284 |
| 8,812,007 B2* | 8/2014 | Hitt et al. | 455/450 |
| 2004/0083833 A1 | 5/2004 | Hitt et al. | 73/866 |
| 2004/0090329 A1* | 5/2004 | Hitt | 340/552 |
| 2004/0090345 A1* | 5/2004 | Hitt | 340/870.11 |
| 2004/0100394 A1* | 5/2004 | Hitt | 340/870.11 |
| 2004/0194833 A1* | 10/2004 | Townsend et al. | 137/624.11 |
| 2005/0090936 A1* | 4/2005 | Hitt et al. | 700/284 |
| 2005/0107924 A1* | 5/2005 | Bailey et al. | 700/284 |
| 2005/0194456 A1* | 9/2005 | Tessier et al. | 236/51 |
| 2005/0216130 A1* | 9/2005 | Clark et al. | 700/284 |
| 2005/0267641 A1* | 12/2005 | Nickerson et al. | 700/284 |
| 2005/0273205 A1* | 12/2005 | Nickerson et al. | 700/284 |
| 2007/0016334 A1* | 1/2007 | Smith et al. | 700/284 |
| 2007/0162188 A1* | 7/2007 | Bailey et al. | 700/284 |
| 2008/0011864 A1* | 1/2008 | Tessier et al. | 236/51 |
| 2008/0027587 A1* | 1/2008 | Nickerson et al. | 700/284 |
| 2008/0058964 A1* | 3/2008 | Nickerson et al. | 700/19 |
| 2008/0119948 A1* | 5/2008 | O'Connor | 700/9 |
| 2008/0129495 A1* | 6/2008 | Hitt | 340/539.26 |
| 2008/0154437 A1* | 6/2008 | Alexanian | 700/284 |
| 2008/0275595 A1* | 11/2008 | Bailey et al. | 700/284 |
| 2008/0288116 A1* | 11/2008 | Nickerson | 700/284 |
| 2008/0288117 A1* | 11/2008 | Nickerson | 700/284 |
| 2008/0319585 A1* | 12/2008 | Nickerson et al. | 700/284 |
| 2009/0007706 A1* | 1/2009 | Hitt et al. | 73/866 |
| 2009/0094097 A1* | 4/2009 | Gardenswartz | 705/10 |
| 2009/0145974 A1* | 6/2009 | Fekete | 239/11 |
| 2009/0150001 A1* | 6/2009 | Fekete | 700/284 |
| 2009/0150002 A1* | 6/2009 | Fekete | 700/284 |
| 2009/0204265 A1* | 8/2009 | Hackett | 700/284 |
| 2009/0216345 A1* | 8/2009 | Christfort | 700/21 |
| 2009/0281672 A1* | 11/2009 | Pourzia | 700/284 |
| 2009/0316671 A1* | 12/2009 | Rolf et al. | 370/338 |
| 2010/0030389 A1* | 2/2010 | Palmer et al. | 700/284 |
| 2010/0030476 A1* | 2/2010 | Woytowitz et al. | 702/3 |
| 2010/0100247 A1* | 4/2010 | Nickerson et al. | 700/284 |
| 2010/0145530 A1* | 6/2010 | Nickerson et al. | 700/284 |
| 2010/0145531 A1* | 6/2010 | Nickerson et al. | 700/284 |
| 2010/0152909 A1* | 6/2010 | Hitt et al. | 700/284 |
| 2010/0168924 A1* | 7/2010 | Tessier et al. | 700/278 |
| 2010/0179701 A1* | 7/2010 | Gilbert et al. | 700/284 |
| 2010/0222932 A1* | 9/2010 | O'Connor | 700/284 |
| 2010/0312404 A1* | 12/2010 | Nickerson | 700/284 |
| 2011/0035059 A1* | 2/2011 | Ersavas | 700/276 |
| 2011/0040415 A1* | 2/2011 | Nickerson et al. | 700/284 |
| 2011/0040416 A1* | 2/2011 | Nickerson et al. | 700/284 |
| 2011/0077785 A1* | 3/2011 | Nickerson et al. | 700/284 |
| 2011/0093123 A1* | 4/2011 | Alexanian | 700/284 |
| 2011/0110291 A1* | 5/2011 | Ishii | 370/315 |
| 2011/0111700 A1* | 5/2011 | Hackett | 455/41.2 |
| 2011/0137472 A1* | 6/2011 | Hitt et al. | 700/284 |
| 2011/0178644 A1* | 7/2011 | Picton | 700/282 |
| 2011/0202185 A1* | 8/2011 | Imes et al. | 700/277 |
| 2011/0214060 A1* | 9/2011 | Imes et al. | 715/735 |
| 2011/0238228 A1* | 9/2011 | Woytowitz et al. | 700/284 |
| 2011/0246898 A1* | 10/2011 | Imes et al. | 715/735 |
| 2011/0270448 A1* | 11/2011 | Kantor et al. | 700/284 |
| 2011/0270449 A1* | 11/2011 | Nickerson et al. | 700/284 |
| 2011/0301767 A1* | 12/2011 | Alexanian | 700/284 |
| 2012/0046859 A1* | 2/2012 | Imes et al. | 701/409 |
| 2012/0054125 A1* | 3/2012 | Clifton et al. | 705/412 |
| 2012/0064923 A1* | 3/2012 | Imes et al. | 455/457 |
| 2012/0078425 A1* | 3/2012 | Gardenswartz | 700/284 |
| 2012/0095604 A1* | 4/2012 | Alexanian | 700/284 |
| 2012/0109387 A1* | 5/2012 | Martin et al. | 700/284 |
| 2012/0191261 A1* | 7/2012 | Nickerson | 700/284 |
| 2012/0221154 A1* | 8/2012 | Runge | 700/284 |
| 2012/0239211 A1* | 9/2012 | Walker et al. | 700/284 |
| 2012/0259473 A1* | 10/2012 | Nickerson et al. | 700/284 |
| 2012/0261487 A1* | 10/2012 | Palmer et al. | 239/63 |
| 2012/0273704 A1* | 11/2012 | O'Connor | 251/129.04 |
| 2012/0290140 A1* | 11/2012 | Groeneveld | 700/284 |
| 2012/0303168 A1* | 11/2012 | Halahan et al. | 700/284 |
| 2013/0038218 A1* | 2/2013 | Xu et al. | 315/151 |
| 2013/0123991 A1* | 5/2013 | Richmond | 700/276 |
| 2013/0158724 A1* | 6/2013 | Nickerson et al. | 700/284 |
| 2013/0162390 A1* | 6/2013 | Ersavas et al. | 340/3.1 |
| 2013/0190935 A1* | 7/2013 | Nickerson et al. | 700/284 |
| 2013/0207771 A1* | 8/2013 | Ersavas et al. | 340/3.1 |
| 2013/0226357 A1* | 8/2013 | Ersavas et al. | 700/284 |
| 2013/0227126 A1* | 8/2013 | Imes et al. | 709/224 |
| 2013/0318217 A1* | 11/2013 | Imes et al. | 709/221 |
| 2013/0325997 A1* | 12/2013 | Higgins et al. | 709/208 |
| 2014/0031996 A1* | 1/2014 | Nickerson et al. | 700/284 |
| 2014/0081471 A1* | 3/2014 | Woytowitz et al. | 700/284 |
| 2014/0088770 A1* | 3/2014 | Masters et al. | 700/284 |
| 2014/0088771 A1* | 3/2014 | Woytowitz et al. | 700/284 |
| 2014/0229025 A1* | 8/2014 | Nickerson et al. | 700/284 |
| 2014/0249684 A1* | 9/2014 | Nickerson et al. | 700/284 |

* cited by examiner

SYSTEM AND METHOD FOR WIRELESS IRRIGATION CONTROL WITH A REMOTE APPLICATION

FIELD OF THE INVENTION

The present invention relates generally to the field of automated irrigation systems and methods for their control and more specifically to automated irrigation systems controlled over existing wireless networks in connection with remote applications

BACKGROUND

Many homes enjoy private landscaping. Lawns, trees, shrubs and plants of many varieties can be used by homeowners or landscapers to create a pleasing personal outdoor environment. But plants, even of the desert variety, do require water to survive.

Many homes therefore are equipped with irrigation control systems in an effort to help the homeowner or landscape caregiver maintain the landscape plants. In their simplest form, a controller can be a set of valves that are manually activated when watering is desired. Manual operation is far from convenient in most settings so such control systems are not highly desired.

Often control systems are equipped with a timer so that valve operation can be established both for a given time of day and for a given duration. Establishing this watering schedule may be a tedious task involving tiny switches, codes and sequences of button presses upon a keypad. Entering a wrong button press or sequence can result in an undesired watering schedule that may or may not be immediately evident to the programmer. If not discovered, such errant programming may result in far too much water being provided, potentially resulting in not only water waste, but also overwatering if not flooding and damage land and structures. Too little water may result in plant death.

Adjustments to such watering systems are not easily made, so once a schedule is established many homeowners file the instruction manual away and never opt to change the schedule. As weather patterns change and perhaps even plants are replaced, grow or are removed, the failure to adjust the watering schedule may well result in waste of water resources as well less then desired care for the plants. Moreover the established watering schedule is maintained throughout the year, regardless of rain or heat.

Other shortcomings abound as well. Typical irrigation control systems operate in a linear fashion, which is to say that they operate a first zone for one duration, then move to activate a second zone for another duration, and then a third zone for yet another duration. Skipping a zone or watering zones out of order on different days may not be possible, and even if possible may not be easily achieved if the owner has misplaced his or her operating manual.

Further, some plants such as young plants, fresh grass and seeds for example often require frequent watering in short durations. Typical watering systems operating in a linear zone by zone fashion may not permit multiple repeated watering schedules.

Should a zone malfunction such systems do not inform the homeowner in any way, such that the first indication of a problem is typically the owner's observation of either flooding or dead dry plants.

Providing larger display panels on irrigation control systems may well help the owner/operator in programming and control, but such larger displays also increase costs. Also, as most irrigation control systems are placed in garages or closets, regardless of the display size and quality, actually viewing the display easily and in a comfortable environment may not be easy for all homeowners and operators.

Some watering systems have attempted to address some of these issues, such as for example U.S. Pat. No. 7,010,396 to Ware et al. entitled Irrigation Controller With Embedded Web Server, U.S. Pat. No. 6,832,239 to Sieminski entitled Internet-Enabled Central Irrigation Control, and US Patent Application 2009/0281672 to Pourzia entitled Weather Responsive Irrigation Systems and Methods.

In Ware, U.S. Pat. No. 7,010,396, an irrigation controller with an embedded web server activates irrigation devices in accordance with an event schedule. More specifically, "the controller 330 also contains an embedded web server that serves one or more web pages (not shown) to the browser equipped client(s) 320." (Col. 6 lines 31-35).

Although perhaps beneficial in some settings, this web-serving ability of the Ware irrigation controller raises the complexity of the irrigation controller both in terms of it's fabrication process as well as it's method of use. Updates to features or corrections of software bugs must be made directly to the controller, which of course requires that the controller be on-line and in direct connection with the Internet. For users who do not wish to avail themselves of the Internet, Ware is impractical.

In Sieminski, U.S. Pat. No. 6,832,239, an irrigation controller is coupled to a wide area network, such as the Internet. More specifically, Sieminski teaches that a user does not communicate with the Sieminski irrigation control except through the Internet or via a stand alone controller, shown in Sieminski FIG. 2, which as illustrated and described appears typical of the existing display and button systems of conventional irrigation controllers.

As taught by Sieminski, the user establishes the schedule for watering with a web bases server that then transmits the schedule back through the Internet to a wireless carrier 108 which in turn is in communication with a plurality of wireless irrigation controllers 110.

Moreover, Sieminski is most applicable to a commercial setting where watering stations can be far apart such that wireless communication between the irrigation controller and the watering station is desirable. Centralization of the watering schedule with an Internet connected database may be beneficial in some settings, but if Internet access is not available or desired, the watering schedule cannot be accessed and implemented. Indeed a user of Sieminski must have not only a computer system, but also Internet access even if he or she is directly proximate to the watering area and controller if the web-based interface is to be used instead of the traditional on-device display and button system.

In Pourzia, US Patent Application 2009/0281672, the emphasis is for a weather responsive system that is truly composed of two key elements—the irrigation controller itself and it's access point. As is shown and described by Pourzia with respect to at least FIGS. 1 and 2, a user communicates with the controller 12 by way of a wireless access point 16 that is either coupled to the users computer (FIG. 1) or to a router (FIG. 2), with this second option being preferred so that the controller 12 can receive new instructions based on weather monitoring systems.

Moreover, all control is accomplished through the additional access point that is specific to the Pourzia system—not a pre-existing wireless access point such as may be found in many homes already. Further, all control is via web-browser interaction, with the irrigation controller having a dedicated and specific user interface system 56 which is again comprised of a typical output device such as a liquid crystal display and an input device such as a keypad as with many conventional irrigation controllers.

In addition, the master schedule is held by the client application and not the controller. This client application can be deployed to the user's computer or to the access point. Of course, if it is maintained by the user's computer, then no other systems can modify the system unless they are permitted access to the user's computer, which also must be on. This appears to present a potential problem. A user might well update the watering schedule via his or her personal computer and then shut the computer off. Later, an ASP server may attempt to update the schedule in response to developments overnight, such as for example morning rain, that the user was not aware of. However, as the master schedule is held by the browser application and not the controller, the adjustments attempted by the Internet based ASP server will not be reflected in the users master schedule, if it is even implemented as the client application was accessible. Pourzia does also teach that the access point can host the client application—which in turn would require greater complexity of the access point.

Moreover, many attempts have been made in repeated efforts to provide improved irrigation control in a simple and easily adjustable fashion. Although certainly necessary for the maintenance of plants, most homeowners and or other users do not see the watering system as being a priority and therefore are unlikely to embrace expensive systems that may also have multiple specialized components and or requirements.

Hence there is a need for a system and method that is capable of overcoming the above identified challenges.

SUMMARY

Embodiments of this invention provide a system and method for irrigation control, and more specifically to systems and methods for irrigation control by way of existing wireless home networks and remote configuration applications.

In particular, and by way of example only, according to one embodiment of the present invention, provided is a system for wireless irrigation control with remote application, including: a processor; a plurality of interactive zone switches for connection to at least one irrigation device, each zone switch further structured and arranged to detect a state of the at least one irrigation device; a non-volatile memory coupled to the processor having processor executable instructions to direct operation of each interactive zone switch; at least one remote application to establish a schedule within the non-volatile memory for operation for each interactive zone switch and to receive the schedule from the non-volatile memory in response to a users desire to review or modify the schedule; and a wireless network component coupled to the processor and the non-volatile memory and in communication with the at least one remote application to schedule operation of at least one interactive zone switch and the at least one irrigation device.

In yet another embodiment, provided is a method for wireless irrigation control with remote application, including: providing a plurality of interactive zone switches for connection to at least one irrigation device, each zone switch further structured and arranged to detect a state of the at least one irrigation device; providing a non-volatile memory coupled to a processor, the memory having processor executable instructions to direct the operation of each interactive zone switch; providing a wireless network component coupled to the processor and the non-volatile memory; providing at least one remote application to establish via the wireless network component a schedule within the non-volatile memory for operation of each interactive zone switch; and in response to a users desire to review or modify the schedule, retrieving the schedule from the non-volatile memory.

Further, in yet another embodiment, provided is a system for wireless irrigation control with remote application, including: a remote scheduler structured and arranged to provide a scheduling interface upon a display, the scheduling interface permitting a user to establish a schedule for at least one interactive zone switch coupled to at least one irrigation device; at least one irrigation controller, comprising: a processor; a plurality of interactive zone switches for connection to at least one irrigation device, each zone switch further structured and arranged to detect a state of the at least one irrigation device; a non-volatile memory coupled to the processor having processor executable instructions to direct operation of each interactive zone switch; and a wireless network component coupled to the processor and the non-volatile memory and in communication with the remote scheduler to exchange the schedule of at least one interactive zone switch and the at least one irrigation device, the schedule within the non-volatile memory being a master schedule.

BRIEF DESCRIPTION OF THE DRAWINGS

At least one method and system for irrigation control will be described, by way of example in the detailed description below with particular reference to the accompanying drawings in which like numerals refer to like elements, and.

DETAILED DESCRIPTION

Before proceeding with the detailed description, it is to be appreciated that the present teaching is by way of example only, not by limitation. The concepts herein are not limited to use or application with a specific system or method for irrigation control. Thus although the instrumentalities described herein are for the convenience of explanation shown and described with respect to exemplary embodiments, it will be understood and appreciated that the principles herein may be applied equally in other types of systems and methods for irrigation control.

Figure 1:
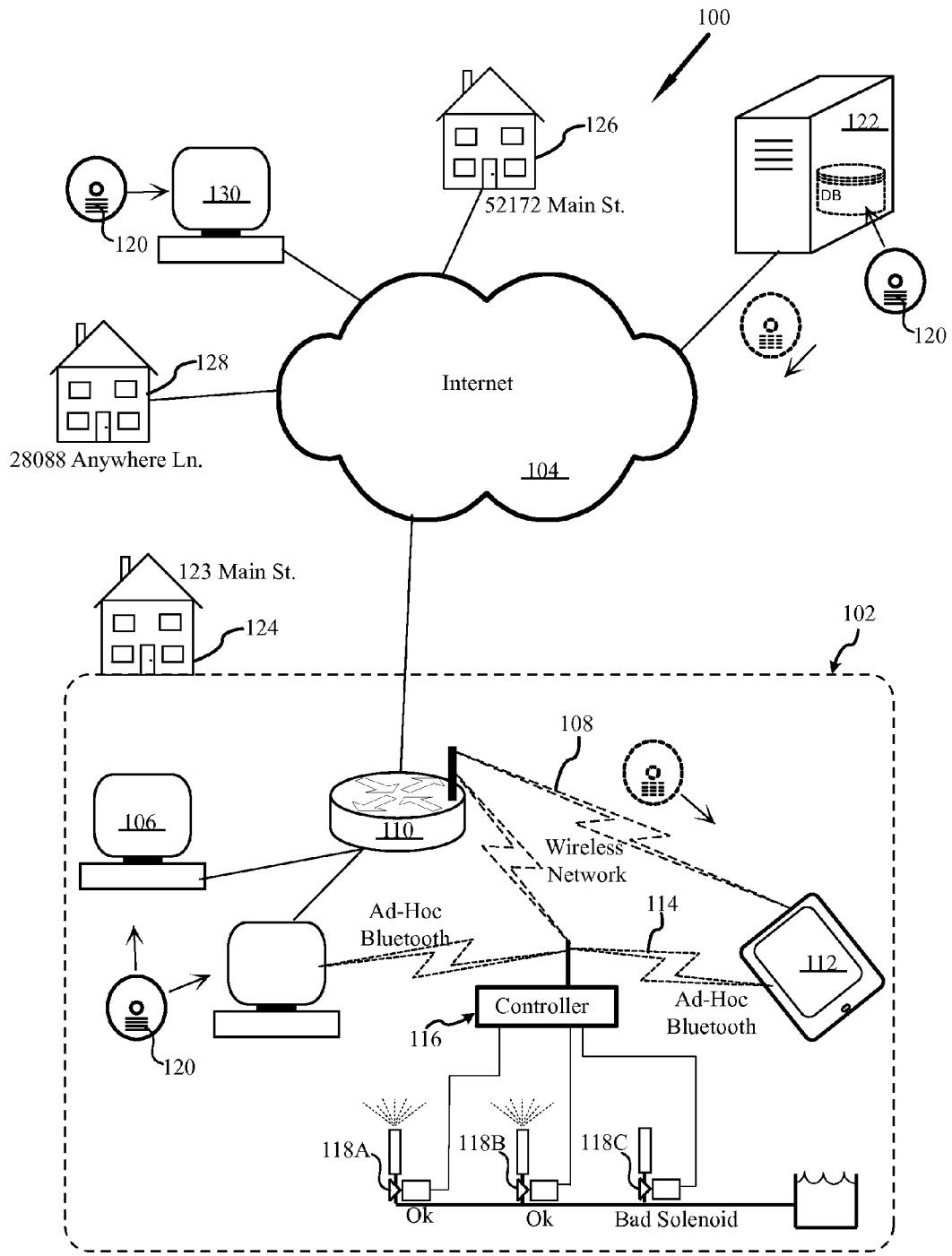
FIG. 1 illustrates a level block diagram of an irrigation control system in accordance with at least one embodiment of the present invention.

Turning now to the figures, and more specifically to FIG. 1, illustrated is a high level block diagram of a wireless irrigation controlling system ("WICS") 100 in accordance with at least one embodiment. As is further described in detail below, stated generally for at least one embodiment, the WICS 100 is structured and arranged to advantageous scheduling and control for a watering system by way of existing wireless networks and resources.

Moreover, the WICS 100 is entirely operable within the confines of a home network 102 or even an ad-hoc network, without need or requirement for Internet 104 resources. As is further discussed below, for some embodiments the Internet 104 may provide further access and control options, but it is not a requirement for each and every instance of use.

As conceptually illustrated within the home network 102, there are one or more computer systems 106 and an existing wireless network 108, such as but not limited to the 802.11 family of network standards, e.g. at the time of this writing 802.11a/b/g/n. As shown the wireless access is provided by an existing device such as a wireless router 110 that may also be proving the home network 102 with access to the Internet 104. The home network 102 may also include one or more hand held computer devices 112, such as smart phones or tablet computes.

Home network 102 may also be an ad-hoc network 114, as in a decentralized wireless network that does not rely on preexisting infrastructure such as routers or access points. Rather each device or node participating in the ad-hoc network forwards data for other notes when and as necessary. For example, in at least one embodiment the home network 102 is, or may also include Bluetooth wireless connectivity.

As is shown, WICS 100 includes a controller 116 having a plurality of interactive switches for connection to at least one irrigation device 118, of which irrigation devices 118A, 118B and 118C are exemplary. WICS 100 further includes at least one remote application 120 to establish an irrigation schedule within the controller 116. More specifically, it is understood and appreciated that the controller 116 does not provide a direct interface for establishing or modifying the irrigation schedule. Further, the controller 116 does not provide active web-pages or a web-server for establishing or modifying the irrigation schedule. Moreover, the remote application 120 as is further described below is responsible for establishing or modifying the irrigation schedule.

The remote application 120 permits user operating a computer 106 or a hand held computer device 112, such as a smart phone or tablet computer to establish an irrigation schedule for the controller 116. Communication with the controller 116 is achieved by way of an existing wireless network. As shown for the home network 102 this may be a traditional wireless network 108 or an ad-hoc network 114. In addition, it should also be appreciated that where a user has only a hand held computing device 112 such as a smart phone or tablet computer, the user may obtain the application 120 from a remote server 122 coupled to the Internet 104.

With respect to FIG. 1, it is also appreciated that the home network 102 with controller 114 is shown as associated to a house 124. Exemplary houses 126 and 128 may also have similar home networks and their own installations of WICS 100.

It should be further appreciated, that because the WICS 100 is established as an element within home network 102, where such a home network 102 does provide access to the Internet, configuration and scheduling of the controller 116 may be accomplished by potentially any user having proper permission rights and computing resources who is also connected to the Internet 40.

Moreover, a gardener or landscaping service tending to house 124 and 126 may have access to computer 130 having an instance of the application 120. As computer 130 is coupled to the Internet 40, this user may be provided with access to monitor and adjust both installations of WICS 100 for houses 124 and 126.

Figure 2:
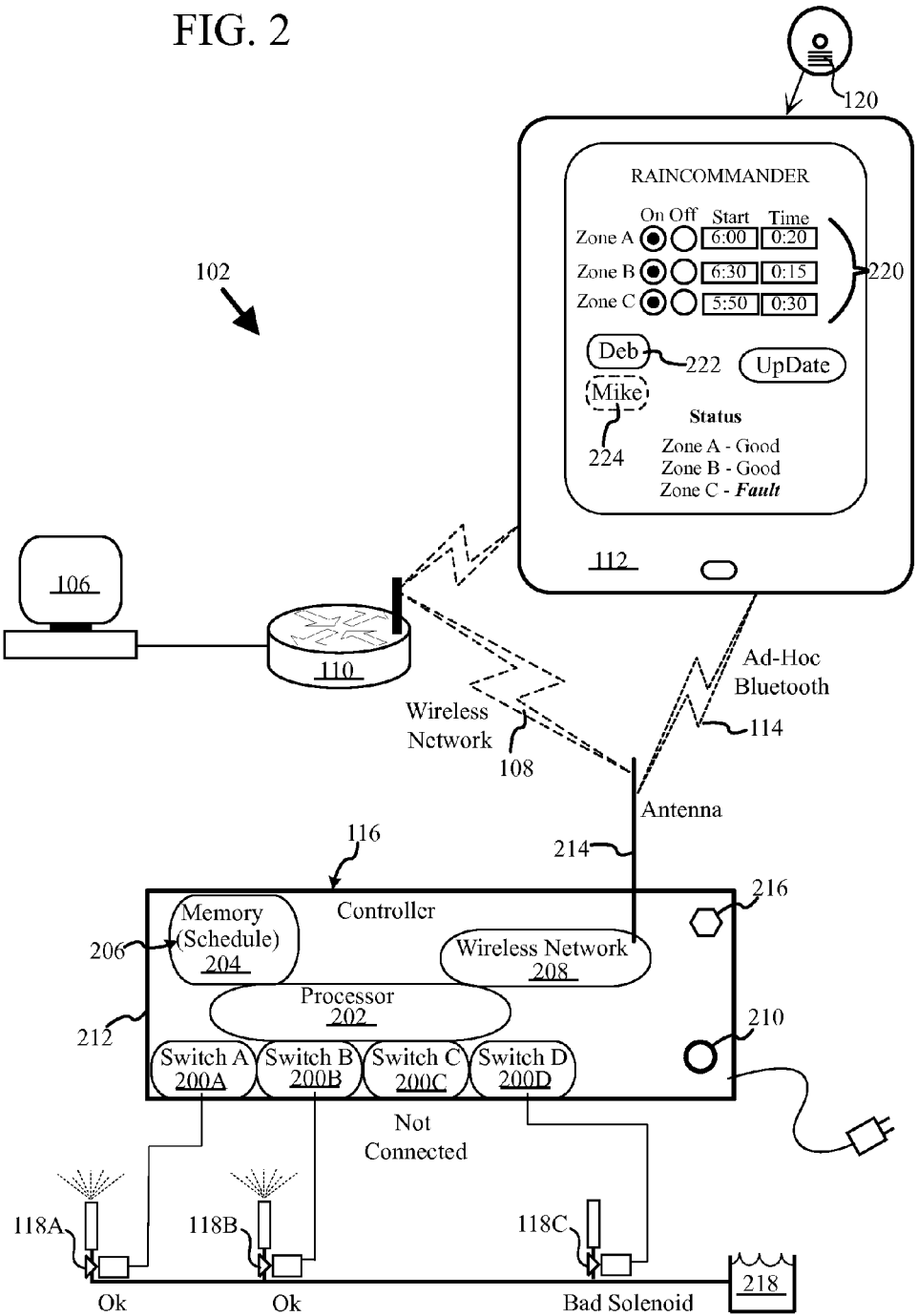
FIG. 2 is a further refined block diagram of the controller and remote application for an irrigation control system in accordance with at least one embodiment of the present invention.

FIG. 2 illustrates the home network 102 in enlarged form to more fully appreciate the elements of the controller 116 and the remote application 120 as they cooperatively provide WICS 100. For at least one embodiment, the controller 116 is shown to have a plurality of interactive zone switches 200, of which zone switches 200A, 200B, 200C and 200D are exemplary. As is described below, each zone switch 200 is further structured and arranged to detect a state of the irrigation device to which it is connected.

The controller 116 also has a processor 202 and a non-volatile memory 204 coupled to the processor 202, the non-volatile memory 204 having executable instructions to direct the operation of each interactive zone switch 200, in accordance with a master schedule 206 maintained by the non-volatile memory 204. A wireless network component 208 is also coupled to the processor and the non-volatile memory 204.

By way of an existing wireless network, such as an 802.11 network, or an ad-hoc network, such as but not limited to a Bluetooth connection, the wireless network component 208 permits the controller 116 to be in communication with at least one instance of the remote application 120 to establish a master schedule 206 for at least one interactive zone switch 200 and the irrigation device 118 to which it is connected.

With respect to the conceptual illustration of the controller 116 in FIG. 2, it is to be specifically noted that the controller 116 does not provide a web server or a local user interface such as a display and keypad. Moreover, to provide advantageous flexibility of features and ability with reduced production cost, at least one embodiment of controller 116 does not permit direct manual programming, requiring the operating user to use the remote application to establish a master schedule 206 within the non-volatile memory 204 for operation of each interactive zone switch 200.

Controller 116 may have a status light 210 that is operable to indicate the general status of the controller 116. For example the status light 210 may glow to indicate a general state of ON. For varying embodiments the status light 210 may also glow in different colors or blink to indicate various states, such as but not limited to—green as general status ok, blinking to indicate exchange of data with remote application 120, and or red to indicate a fault. In yet another embodiment each zone is represented by an indicator light such as an LED. Further, the LEDs may be configured to provide an indication of status, e.g. green for on, red for fault, and off for off. Further still, in at least one embodiment, WICS 100 is configured with a master switch operable to shut off all water supply, the master switch also having an LED stats light.

For at least one embodiment, the interactive zone switches 200, processor 202, non-volatile memory 204 and wireless network component 208 are disposed at least partially within a protective case 212, such as but not limited to a polycarbonate case. Further, although for ease of illustration the antenna 214 of wireless network component 208 is shown extending from the controller 116, the antenna 214 may be disposed within the case 212.

Controller 116 may also have an optional button 216 which when pressed sets the controller 116 into a state intended to help achieve initial wireless connection. For example, in at least one embodiment, depressing this button permits controller 116 to accept new Bluetooth paring, e.g. connections, for 60 seconds. If a connection is not established the controller 116 returns to the prior state. If a new connection is established, the remote application 120 permits configuration of the controller 116 for traditional wireless connection as well as Bluetooth connection. Companies, such as for example Netgear, offer similar push to connect options that may also be employed in varying embodiments.

As noted, each zone switch 200 is intended for connection to at least one irrigation device 118, of which irrigation devices 118A, 118B and 118C are exemplary. Each zone switch 200 is further structured and arranged to detect a state of the irrigation device to which it is connected. More specifically, in general the irrigation device is at least in part a solenoid activated valve, which when activated by the application of a current, permits water 218 to flow through the valve and irrigate the activated zone. Deactivation of the current allows the solenoid to close, and ceases the flow of water 218.

For at least one embodiment each zone switch 200 is structured and arranged to detect the state of the irrigation device by monitoring the current flow through the switch. For example, as shown zone switches 200A and 200B can detect that the irrigation devices 118A and 118B are operating as current is flowing to indicate that the solenoids of irrigation device 118A and 118B are operating. Zone switch 200D can detect that irrigation device 118D is not operating as a proper current flow is not detected indicating that the solenoid of irrigation device 118C has failed. Moreover, in varying embodiments the state of the irrigation device may be selected from the group consisting of connected, disconnected, open and closed. Each of these states may be compared to a record indicating the expected state to determine not only that the state is correct, but also the proper functioning of the irrigation device 118.

With respect to FIG. 2 a conceptual illustration of the remote application 120 as it may appear upon a tablet computer 112 is also shown. As tablet computer and smart phones and even laptop and desktop system continue to enjoy increasing diversities of programming, graphical applications that are not traditional websites are becoming more common. A user may have remote application 120, represented by an icon, which when selected instantiates a functional instance of remote application 120 to permit the user to establish, review and/or adjust the irrigation schedule.

More specifically, application 120 is a graphical application that polls the master schedule 206 from the non-volatile memory 204. For at least one embodiment, an initial default master schedule 206 is provided. For at least one embodiment, this default master schedule 206 is defined to be to permit irrigation on each connected irrigation device 118 for a period of 20 minutes starting at what the controller believes to be 6:00 AM. For at least one embodiment, the controller 116 includes instructions to poll, if possible an NTP time server or other network resource to establish the current time for the controller's location of installation.

Indeed it is to be understood and appreciated that in WICS 100, the master schedule 206 for irrigation is maintained by the controller 116. As such, each instance of remote application 120 as may be used to connect to controller 116 is ensured to receive the current schedule. Harmony is thereby also maintained between multiple instances of remote application 120 and/or multiple users.

Moreover, when a computing device 106/112 having remote application 120 loaded thereon is directed to connect to the controller 116, the application will retrieve the master schedule 206 from the non-volatile memory 204 before establishing a change to the schedule and uploading a new master schedule 206 to the non-volatile memory 204. Modification of the master schedule 206 can be handled as an atomic transition to insure that simultaneous, but different schedule adjustments do not occur.

Atomic transactions are guaranteed to have either of two outcomes—either complete execution (commit) or leave no trace of execution (abort), and when multiple processes attempt to perform conflicting atomic transactions simultaneously, their atomic nature guarantees that the transactions that succeed are serializable, meaning that they appear to execute one after the other without intermingling. Guaranteeing atomic transactions frees the programmer from concerns over partial updates occurring, which could lead to corruption of data and/or an errant view of the data. Moreover, to interact atomically is to interact via atomic transactions, such that each interaction either is or is not completely successful.

It should be noted that interactive switch 200C has not been connected. This has been shown so as to demonstrate that controller 116 is able to detect that there are only three current zones, and the application properly reflects them as Zones A, B and C. Moreover, controller 116 permits a user to wire the zones as he or she sees fit, and if a switch is not connected for whatever reason the controller 116 will self adjust.

With respect to the exemplary remote application 120, the master schedule 206 as retrieved from the non-volatile memory 204 is displayed as schedule 220. For at least one embodiment, the user is permitted to turn zones on or off, set start times and duration, and Update the master schedule 206 when he or she is satisfied with the schedule. The application also reports the status of each zone, and as discussed above, Zone A and Zone B corresponding to interactive switches 200A and 200B are shown to be "Good" whereas Zone C corresponding to interactive switch 200D is shown to be "Fault".

Further still, in this exemplary instance the application 120 indicates that this is an irrigation schedule for "Deb" 222. For the sake of illustration and discussion, this user has been illustrated as authorized to access a controller 116 present in "Deb" 224 and another controller 116 present in "Mike." The "Mike" 224 button is shown in dotted relief to indicate it is not the current selection.

Moreover, with respect to FIG. 2 WICS 100 can be summarized as having two basic components. The first is a remote scheduler, i.e., the remote application 120 on computer 112, structured and arranged to provide a scheduling interface permitting a user to establish a schedule 220 for at least one interactive zone switch 200 coupled to at least one irrigation device 118.

The second is at least one irrigation controller 116. The irrigation controller 116 including a processor 202, a plurality of interactive zone switches 200 for connection to at least one irrigation device 118, each zone switch further structured and arranged to detect a state of the irrigation device to which it is connected. The controller 116 also includes a non-volatile memory 204, coupled to the processor 202 and having processor executable instructions to direct operation of each interactive zone switch 200. Further, a wireless component 208 is coupled to the processor 202 and the non-volatile memory 204 and is structured and arranged for communication with the remote scheduler to exchange the schedule 206 of at least one interactive zone switch 200.

Figure 3:
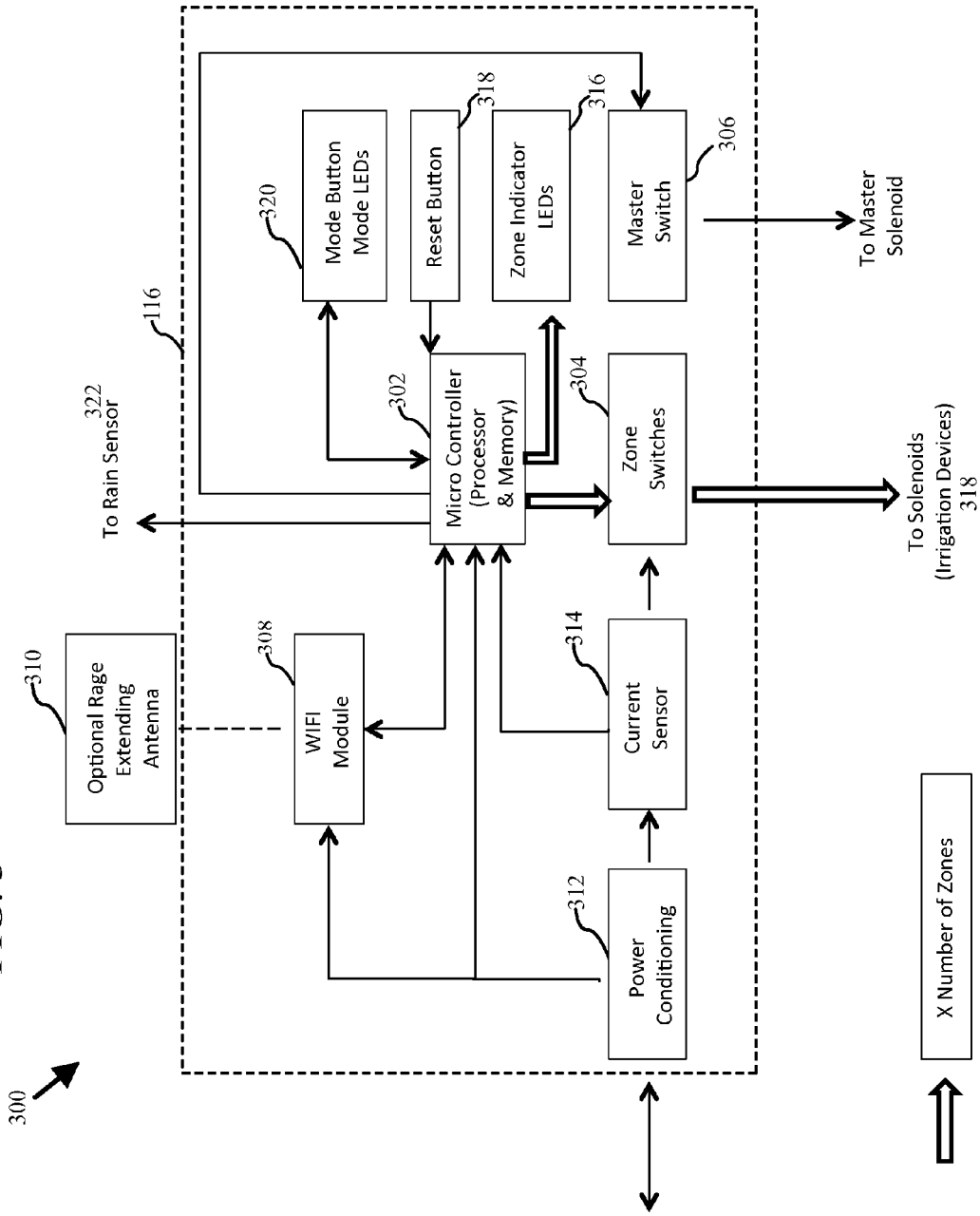
FIG. 3 is a conceptual circuit diagram of the controller for an irrigation control system in accordance with at least one embodiment of the present invention.

FIG. 3 illustrates a conceptual circuit 300 layout for at least one prototype embodiment of controller 116. It will be appreciated that circuit 300 does not include a display or key pad input device as is typical with traditional irrigation control systems.

With comparative reference to FIG. 2, in FIG. 3 the memory 204 and processor 202 of FIG. 2 are in FIG. 3 combined as the micro controller 302. The micro controller 302 is coupled to the zone switches 304 as well as a master switch 306, the master switch 306 permitting the micro controller 302 to halt all water flow to the irrigation system in the event that a fault is determined, such as an irrigation device 118 (see FIG. 2) being stuck open.

The micro controller 302 is also coupled to the WIFI Module, 308 (wireless network component 208 of FIG. 2), which in turn may be optionally connected to a range extending antenna, 310.

Power from a power supply, such as a wall socket, is received by a power conditioning element 312, which in turn supplies power to the WIFI module 308, the micro controller 302 and the current sensor 314. The current sensor 314, is also coupled to the micro controller 302 and is structured and arranged such that the micro controller 302 is aware of the flow of current indicating that a selected zone switch 304 is properly operating or not.

The micro controller 302 is also coupled to a set of zone indicator LEDs 316, which as suggested above are structured and arranged to indicate the status of each zone—e.g., green for on, red for fault, or light off for off Other colors and or indications may also be provided in varying embodiments.

A reset button 318 is also provided to permit a reset of the controller 116 back to factory default settings. An optional mode button 320 is also provided to permit a user to set the controller 116, and specifically the micro controller 302 into an initializing state for connection via an existing wireless network 118 or ad-hoc wireless connection 114. For the embodiment shown, the micro controller 302 is also coupled to a rain sensor 322 such that if rain is detected, the micro controller 302 will skip scheduled watering.

When the user installs the controller 116 and initializes it, he or she provides the number of zones in his or her watering environment. It is understood and appreciated that in general a user will select a controller 116 with a sufficient number of zone controlling switches to meet the needs of his or her watering environment. For at least one embodiment the controller 116 includes an expansion port, not shown, which permits the connection of an additional set of zone switches to be coupled to the controller—thus permitting the user to advantageously enhance and expand his or her watering environment without requiring a full replacement of the controller 116 component of WICS 100.

Figure 4:
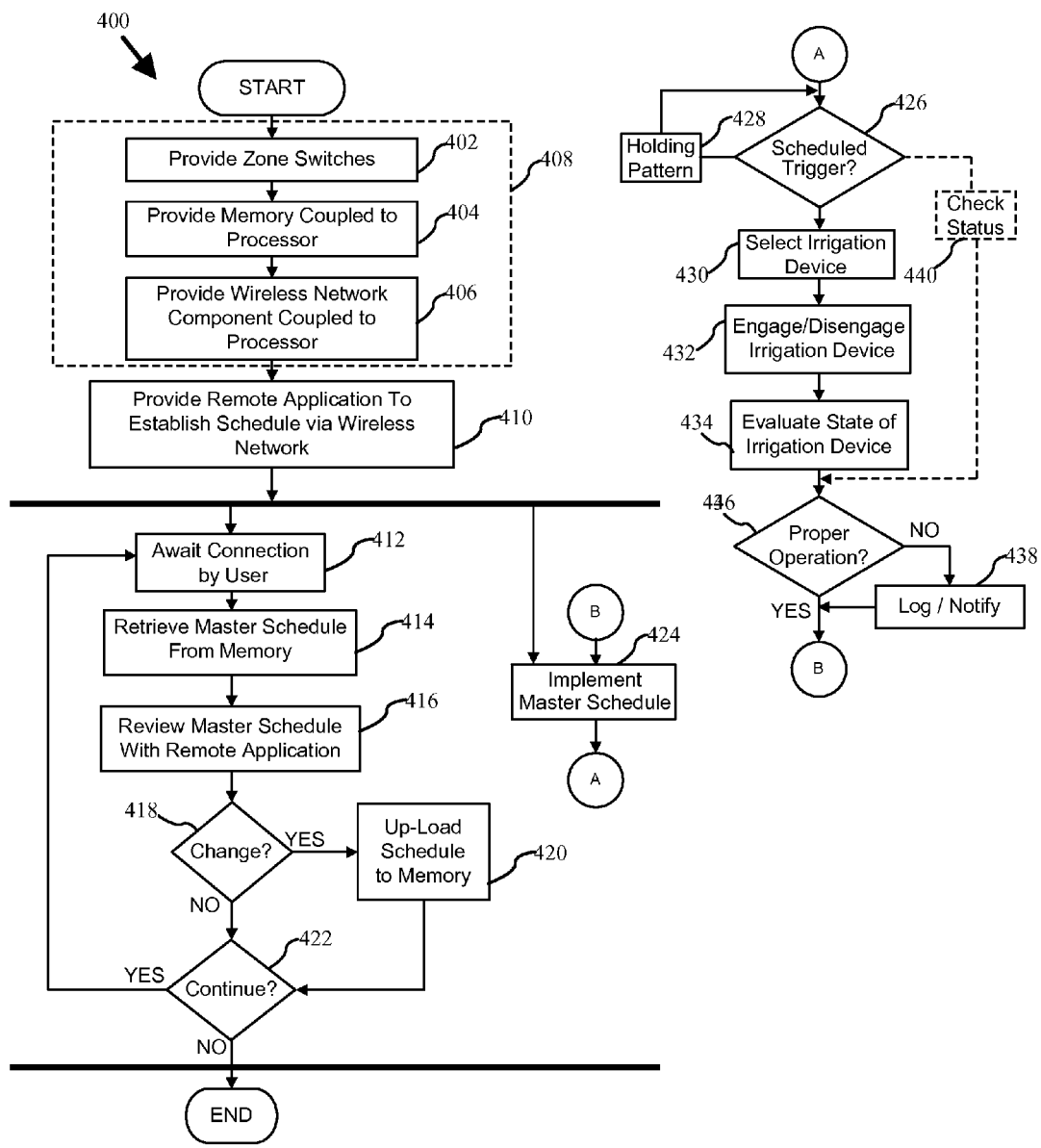
FIG. 4 is a flow diagram for a method of irrigation control in accordance with at least one embodiment of the present invention.

FIG. 4, in connection with FIGS. 1 and 2 conceptually illustrates a high level flow diagram depicting at least one method controlling irrigation in accordance with at least one embodiment. It will be appreciated that the described method need not be performed in the order in which it is herein described, but that this description is merely exemplary of one method for controlling irrigation.

In general, the method 400 commences with the controller 116 being provided and installed in a users home or other environment where irrigation system control is desired. More specifically, a plurality of interactive zone switches 200 for connection to at least one irrigation device 118 are provided, block 402. Each interactive zone switch 200 is structured and arranged to detect a state of the irrigation device 118 to which it is connected.

A non-volatile memory 204 coupled to a processor 202 are also provided, the memory having processor executable instructions to direct the operation of each interactive zone switch, block 404. A wireless network component 208 coupled to the processor and non-volatile memory is also provided, block 406. Moreover, blocks 402, 404 and 406 represent the core elements of the controller 116, and as indicated by dotted line 408 are for at least one embodiment pre-fabricated into a single device with a protective housing.

The remote application 120 is also provided to establish via the wireless network component 208 a schedule within the non-volatile memory 204 for operation of each interactive zone switch 200, block 410.

When installed and activated, the controller 116 enters a state of awaiting connection by a user, block 412. Upon the connection by a user, the master schedule is retrieved from memory, block 414. As the controller is not providing webpages, but merely the data representing the schedule itself, the transfer rate of the master schedule is anticipated to be quite high.

Upon receipt of this data, the remote application 120 interprets the data and provides it to the user graphically for review, block 416. For at least one embodiment the master schedule 206, or metadata transmitted in addition can provide status information regarding the state of each zone. If the user desires to change the schedule, decision 418, he or she manipulates the application to effectuate the desired change and uploads the schedule to the non-volatile memory 204 of the controller 116, block 420. If no change is desired, no action by the user is required.

In at least one embodiment, the controller 116, has a master power switch, so that it can be powered off by a user during desired periods such as winter, or when maintenance is desired. As such, the method 400 permits a decision 422 as to continue or not.

For at least one embodiment, substantially concurrent with the action of waiting for a connection by a user, block 412, the controller 116 also acts to implement the master schedule 206, block 424.

Implementation of the master schedule 206 generally occurs with a scheduled trigger, decision 426. If the schedule does not indicate a scheduled trigger, decision 426, the method 400 may remain in a holding pattern, block 428.

In the event that a trigger is scheduled, decision 424, the method 400 moves to select the triggered irrigation device, or more specifically the interactive switch 200 in control of the irrigation device to be triggered, block 430. The specified irrigation device is then engaged or disengaged in accordance with master schedule 206, block 432.

When the specified irrigation device is activated or deactivated, the method 400 also evaluates the state of the specified irrigation device, block 440. In the event the operation is deemed proper, decision 436, no action is taken. In the event the operation is deemed improper, decision 436, a log entry and or notification to the user is dispatched, block 438.

For at least one optional embodiment, if a schedule does not indicate a scheduled trigger, decision 424, the method 400 may optionally check the state of all connected irrigation devices 118 at periodic intervals, block 438. Where state is determined to be proper, decision 434 no further action is taken. If however, the state is determined to be improper, a log and or notification may be dispatched, block 436. Such proactive monitoring may advantageously help a user of WICS 100 quickly address faults in the irrigation system.

Figure 5:
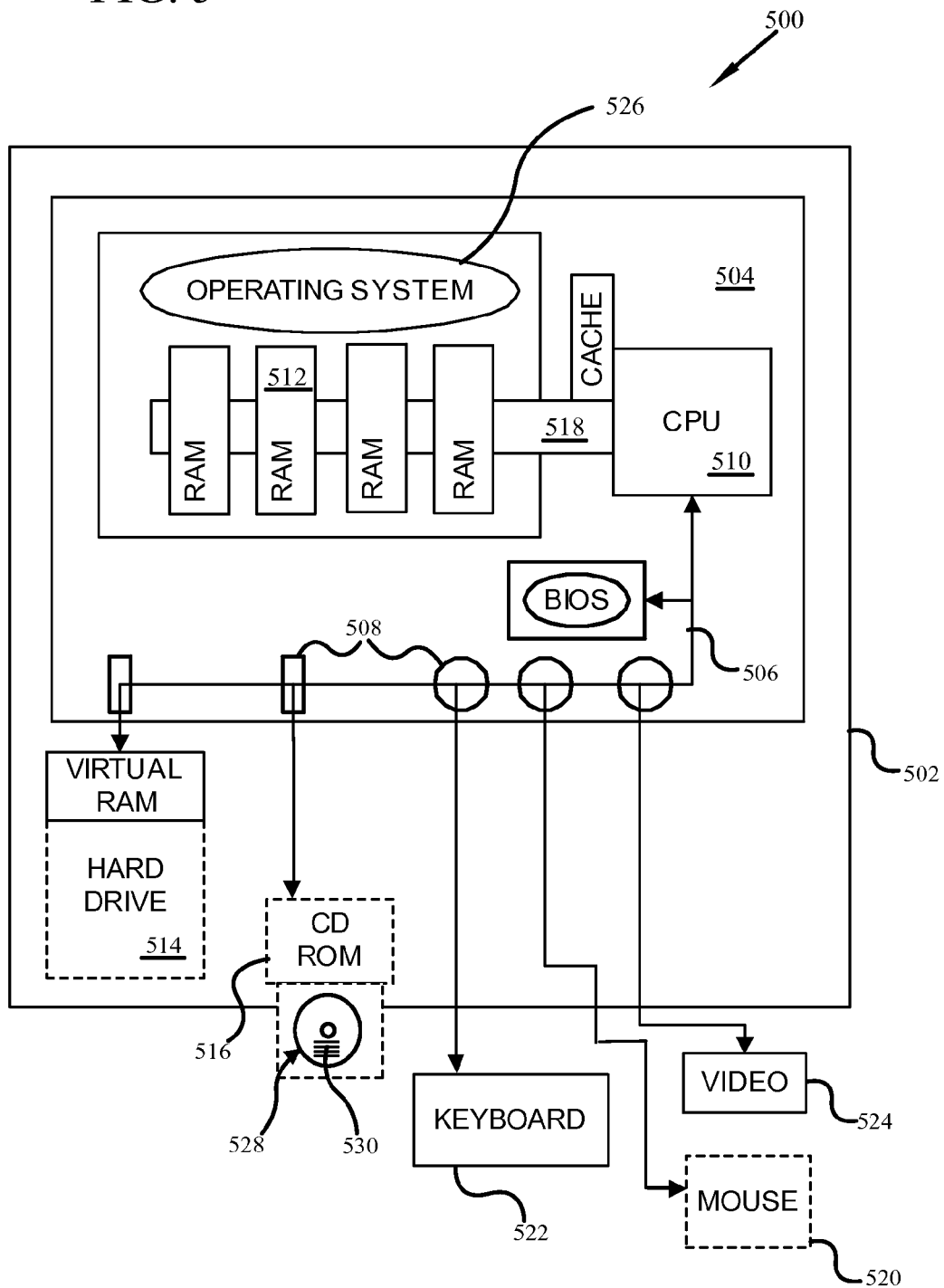
FIG. 5 is a block diagram of at least one computer system in accordance with certain embodiments of the present invention.

With respect to the above description of WICS 100 and method 400, it is understood and appreciated that the method may be rendered in a variety of different forms of code and instruction as may be preferred for different computer systems and environments. To expand upon the initial suggestion of a processor based device such as computer systems 106/130 and or hand held computer devices 112, such as smart phones or tablet computers shown in FIGS. 1 and 2, and discussed above, FIG. 5 is a high-level block diagram of an exemplary computer system 500. Computer system 500 has a case 502, enclosing a main board 504. The main board has a system bus 506, connection ports 508, a processing unit, such as Central Processing Unit (CPU) 510 and a memory storage device, such as main memory 512, and optionally a solid sate drive or hard drive 514 and/or CD/DVD ROM drive 516.

Memory bus 518 couples main memory 512 to CPU 510. In optional configurations the system bus 506 may also couple hard drive 514, CD/DVD ROM drive 516 and connection ports 508 to CPU 510. Multiple input devices may be provided, such as for example a mouse 520 and keyboard 522. Multiple output devices may also be provided, such as for example a video display 524 and a printer (not shown). In varying embodiments, the video display may also be a touch sensitive input device.

Computer system 500 may be a commercially available system, such as a desktop workstation unit provided by IBM, Dell Computers, Gateway, Apple, Sun Micro Systems, or other computer system provider. Computer system 500 may also be a smart phone or tablet computer such as an iPhone or iPad provided by Apple, the HP Slate, the Augen or Archos Android tablets, the Motorola Xoom or other such device.

Computer system 500 may also be a networked computer system, wherein memory storage components such as hard drive 514, additional CPUs 510 and output devices such as printers are provided by physically separate computer systems commonly connected together in the network. Those skilled in the art will understand and appreciate that physical composition of components and component interconnections comprising computer system 500, and select a computer system 500 suitable for use with WICS 100.

When computer system 500 is activated, preferably an operating system 526 will load into main memory 512 as part of the boot strap startup sequence and ready the computer system 500 for operation. At the simplest level, and in the most general sense, the tasks of an operating system fall into specific categories—process management, device management (including application and user interface management) and memory management.

In such a computer system 500, the CPU 510 is operable to perform one or more of the methods of irrigation control as described above. Those skilled in the art will understand that a computer-readable medium 528 on which is the remote application 120 for review, modification and/or establishing the master schedule 206 may be provided to the computer system 500. The form of the medium 528 and language of the program 530 providing the remote application 120 are understood to be appropriate for computer system 500. Utilizing the memory stores, such as for example one or more hard drives 514 and main system memory 512, the operable CPU 502 will read the instructions provided by the computer program 530 and operate to perform the remote application 120 and thereby achieve WICS 100 as described above.

As suggested above with respect to FIG. 1, the computer program 530 may also be provided by a non-portable media such as a disc to a third party computer, such as computer 122, providing an application platform such as but not limited to the Apple App Store. A user can then connect his or her computer 106, or hand held computer 112 to the third party computer, e.g. remote server 122 by a network (wired or wireless) through the Internet 104 other communication channel and obtain remote application 120 so as to adapt his or her computer 106/112/130 to perform the remote application 120 in accordance with WICS 100.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall there between.

What is claimed is:

1. A system for wireless irrigation control with remote application, comprising:
  a wireless network irrigation control module having a self containing housing enclosing;
    a processor;
    a plurality of independently controllable interactive zone switches for connection to a plurality of remote irrigation devices, each zone switch further structured and arranged to detect a diagnostic state of each irrigation device;
    a non-volatile memory coupled to the processor having processor executable instructions to direct operation of each interactive zone switch;
    a wireless network component coupled to the processor and the non-volatile memory;
  at least one remote application to establish a schedule within the non-volatile memory for operation for each interactive zone switch and to receive the schedule from the non-volatile memory in response to a users desire to review or modify the schedule, the application further permitting direct control of each interactive zone switch.

2. The system of claim 1, wherein the diagnostic state of each of the plurality of irrigation device is selected from the group consisting of connected, disconnected, open, and closed.

3. The system of claim 1, wherein the schedule within the non-volatile memory of the controller is a master schedule, a plurality of remote applications harmoniously adjusting the schedule by retrieving the master schedule from the non-volatile memory before establishing a change to the schedule and uploading a new master schedule to the non-volatile memory.

4. The system of claim 3, where each upload of a new master schedule is an atomic transaction.

5. The system of claim 1, wherein each zone switch directly senses the state of a current applied to activate each irrigation device.

6. The system of claim 1, wherein the remote application is an application in a wireless ad-hock network.

7. The system of claim 1, wherein the remote application is an application in a local area network apart from an Internet.

8. The system of claim 1, wherein the remote application is provided by a computer in a local area network.

9. The system of claim 1, wherein the remote application is provided by at least one remote server accessed via an Internet.

10. The system of claim 1, wherein the remote application is provided by a smart phone, wirelessly communicating with the wireless network irrigation control module.

11. The system of claim 1, wherein the remote application is not a web browser.

12. The system of claim 1, wherein a plurality of remote applications are in communication via the wireless network component with the irrigation controlling system.

13. The system of claim 1, wherein the remote application is structured and arranged to control a plurality of distinct irrigation controlling systems.

14. The system of claim 1, wherein a first remote application is used by a first user and a second remote application is used by a second user.

15. The system of claim 1, wherein the schedule permits multiple activations of each zone switch per day.

16. A method for wireless irrigation control with remote application, comprising:
providing a wireless irrigation controller irrigation controller in a self containing protective case having;
a plurality of independently controllable interactive zone switches for connection a plurality of remote irrigation devices, each zone switch further structured and arranged to detect a diagnostic state of each irrigation device;
a non-volatile memory coupled to a processor, the memory having processor executable instructions to direct the operation of each interactive zone switch;
a wireless network component coupled to the processor and the non-volatile memory;
providing at least one remote application to establish via the wireless network component a schedule within the non-volatile memory for operation of each interactive zone switch, the application further permitting direct control of each interactive zone switch; and
in response to a user's desire to review or modify the schedule, retrieving the schedule from the non-volatile memory, and displaying the schedule to the user within the application.

17. The method of claim 16, wherein a plurality of remote applications harmoniously adjust the schedule by retrieving the master schedule from the non-volatile memory before establishing a change to the schedule and uploading a new master schedule to the non-volatile memory.

18. The method of claim 17, wherein each upload of a new master schedule is an atomic transaction.

19. The method of claim 16, wherein each zone switch directly senses the state of a current applied to activate each irrigation device.

20. The method of claim 16, wherein the state of each irrigation device is selected from the group consisting of connected, disconnected, open, and closed.

21. The method of claim 16, wherein the remote application and the wireless network component communicate via a wireless ad-hock network.

22. The method of claim 16, wherein the schedule permits multiple activations of each zone switch per day.

23. A system for wireless irrigation control with remote application, comprising:
a remote scheduler structured and arranged to provide a scheduling interface upon a display, the scheduling interface permitting a user to establish a schedule for a plurality of interactive zone switches coupled to a plurality of remote irrigation devices, and to directly control each interactive zone switch;
at least one wireless network irrigation controller, comprising:
a self containing housing substantially enclosing;
a processor;
a plurality of independently controllable interactive zone switches for connection to each remote irrigation device, each zone switch further structured and arranged to detect a diagnostic state of each irrigation device;
a non-volatile memory coupled to the processor having processor executable instructions to direct operation of each interactive zone switch; and
a wireless network component coupled to the processor and the non-volatile memory and in communication with the remote scheduler to receive direct control for the interactive zone switches and to exchange the schedule for the interactive zone switches and a plurality of irrigation devices, the schedule within the non-volatile memory being a master schedule.

24. The system of claim 23, wherein a plurality of remote schedulers harmoniously adjusting the schedule by retrieving the master schedule from the non-volatile memory before establishing a change to the schedule and uploading a new master schedule to the non-volatile memory.

25. The system of claim 24, where each upload of a new master schedule is an atomic transaction.

26. The system of claim 23, wherein each zone switch directly senses the state of a current applied to activate each irrigation device.

27. The system of claim 23, wherein the schedule permits multiple activations of each zone switch per day.

* * * * *